(12) United States Patent
West

(10) Patent No.: US 12,072,167 B2
(45) Date of Patent: Aug. 27, 2024

(54) MISSILE SEEKER LIMITED SCAN ARRAY RADAR ANTENNA

(71) Applicant: Rockwell Collins, Inc., Cedar Rapids, IA (US)

(72) Inventor: James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 946 days.

(21) Appl. No.: 17/017,509

(22) Filed: Sep. 10, 2020

(65) Prior Publication Data

US 2022/0074710 A1    Mar. 10, 2022

(51) Int. Cl.
| | |
|---|---|
| *F41G 7/22* | (2006.01) |
| *G01S 13/42* | (2006.01) |
| *H01Q 1/40* | (2006.01) |
| *H01Q 3/38* | (2006.01) |
| *H01Q 13/02* | (2006.01) |
| *G01S 13/02* | (2006.01) |
| *H01Q 1/28* | (2006.01) |

(52) U.S. Cl.
CPC ......... *F41G 7/2246* (2013.01); *F41G 7/2286* (2013.01); *G01S 13/426* (2013.01); *H01Q 1/40* (2013.01); *H01Q 3/38* (2013.01); *H01Q 13/02* (2013.01); *G01S 2013/0254* (2013.01); *G01S 2013/0263* (2013.01); *H01Q 1/281* (2013.01)

(58) Field of Classification Search
CPC .... F41G 7/2246; F41G 7/2286; G01S 13/426; G01S 2013/0254; G01S 2013/0263; H01Q 1/40; H01Q 3/38; H01Q 13/02; H01Q 1/281
See application file for complete search history.

(56) References Cited

U.S. PATENT DOCUMENTS

| | | | |
|---|---|---|---|
| 3,328,794 A | 6/1967 | Baltzer | |
| 4,491,845 A | 1/1985 | Rothenberg | |
| 4,816,836 A * | 3/1989 | Lalezari | H01Q 21/20 156/215 |
| 4,857,936 A * | 8/1989 | Drabowitch | H01Q 3/30 342/425 |
| 6,407,711 B1 * | 6/2002 | Bonebright | H01Q 21/205 343/705 |
| 6,703,982 B2 | 3/2004 | Park | |
| 8,497,812 B2 | 7/2013 | Harokopus et al. | |

(Continued)

FOREIGN PATENT DOCUMENTS

| | | |
|---|---|---|
| GB | 1403769 A | 8/1975 |
| GB | 2252207 B | 12/1992 |
| GB | 2553406 A | 3/2018 |

OTHER PUBLICATIONS

Extended European Search Report in European Application No. 21195506.7 dated Feb. 2, 2022, 11 pages.

*Primary Examiner* — Peter M Bythrow
*Assistant Examiner* — Nazra Nur Waheed
(74) *Attorney, Agent, or Firm* — Suiter Swantz IP

(57) ABSTRACT

An electronically scanned array is comprised of a plurality of radiating horns embedded in a nose cone. The radiating horns are configured as an electronically scanned array. The nose cone comprises a dielectric material with a known thickness in front of the radiating horn opening. Each radiating horn is driven by a phase shifter. The phase shifters are configured to produce a radiation pattern with attenuated side lobes.

15 Claims, 20 Drawing Sheets

(56) References Cited

U.S. PATENT DOCUMENTS

| | | |
|---|---|---|
| 8,704,724 B2 | 4/2014 | Hook |
| 9,091,745 B2 | 7/2015 | Woodell et al. |
| 9,419,329 B1 | 8/2016 | West et al. |
| 9,976,837 B2 | 5/2018 | Boiman et al. |
| 10,224,629 B2 * | 3/2019 | West .................... H01Q 3/2682 |
| 10,288,395 B1 | 5/2019 | Barton |
| 10,663,576 B2 | 5/2020 | Sundell |
| 2005/0012655 A1 | 1/2005 | Lalezari et al. |
| 2017/0214134 A1 | 7/2017 | Stratis et al. |
| 2018/0013203 A1 * | 1/2018 | Wangsvick .......... H01Q 21/205 |
| 2019/0257919 A1 | 8/2019 | Marshall |
| 2020/0185830 A1 | 6/2020 | West |

\* cited by examiner

Peek material above & touching aperture

Aperture w/o PEEK material Nose Cone

MISSILE SEEKER LIMITED SCAN ARRAY RADAR ANTENNA

BACKGROUND

Very small airframes, such as missiles or other munitions, present a challenge when integrating radar systems. Such airframes provide very limited space to house such systems, and the operating environment is hostile to sensitive electronic components. It would be desirable to have a millimeter scale radar antenna system collated with and complementary to a short-wave infrared target location imaging system that is environmentally robust, and that does not compromise the aerodynamics of the platform.

A traditional array of radiating elements may comprise hundreds of radiating elements and corresponding circuitry, and consume a corresponding amount of power.

SUMMARY

In one aspect, embodiments of the inventive concepts disclosed herein are directed to radiating horns embedded in a nose cone. The radiating horns are configured as an electronically scanned array; each radiating horn is embedded in the dielectric material of a nose cone.

In a further aspect, one or more of the radiating horns is driven by a phase shifter. The phase shifters are configured to produce a radiation pattern with attenuated side lobes.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
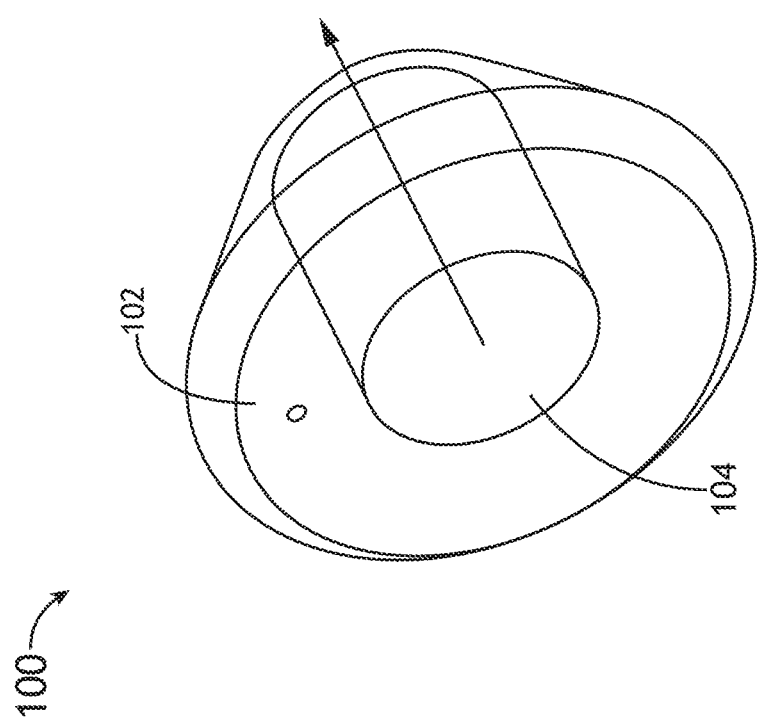
FIG. 1 shows a perspective view of a nose cone suitable for use in exemplary embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to radiating horns embedded in a nose cone. The radiating horns are configured as an electronically scanned array; each radiating horn is embedded in the dielectric material of a nose cone. One or more of the radiating horns is driven by a phase shifter. The phase shifters are configured to produce a radiation pattern with attenuated side lobes.

Referring to FIG. 1, a perspective view of a nose cone 100 suitable for use in exemplary embodiments is shown. The nose cone 100 may define a generally unused annular space 102 (which may be empty or filled with an inert material) and a central space 104 that may house certain electronic elements for the corresponding munition guidance system.

Figure 2:
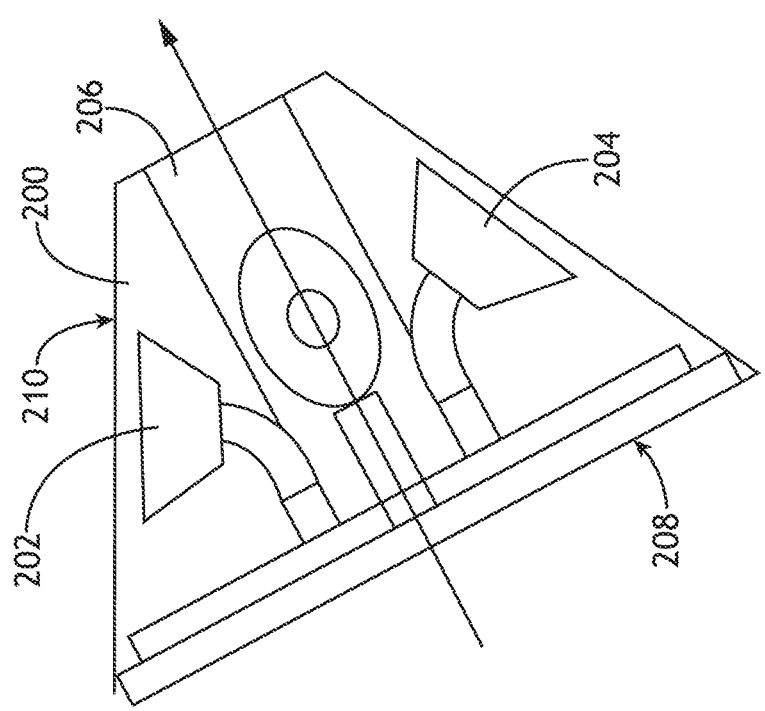
FIG. 2 shows a side view of a nose cone and radar antenna system according to an exemplary embodiment.
Figure 3A:
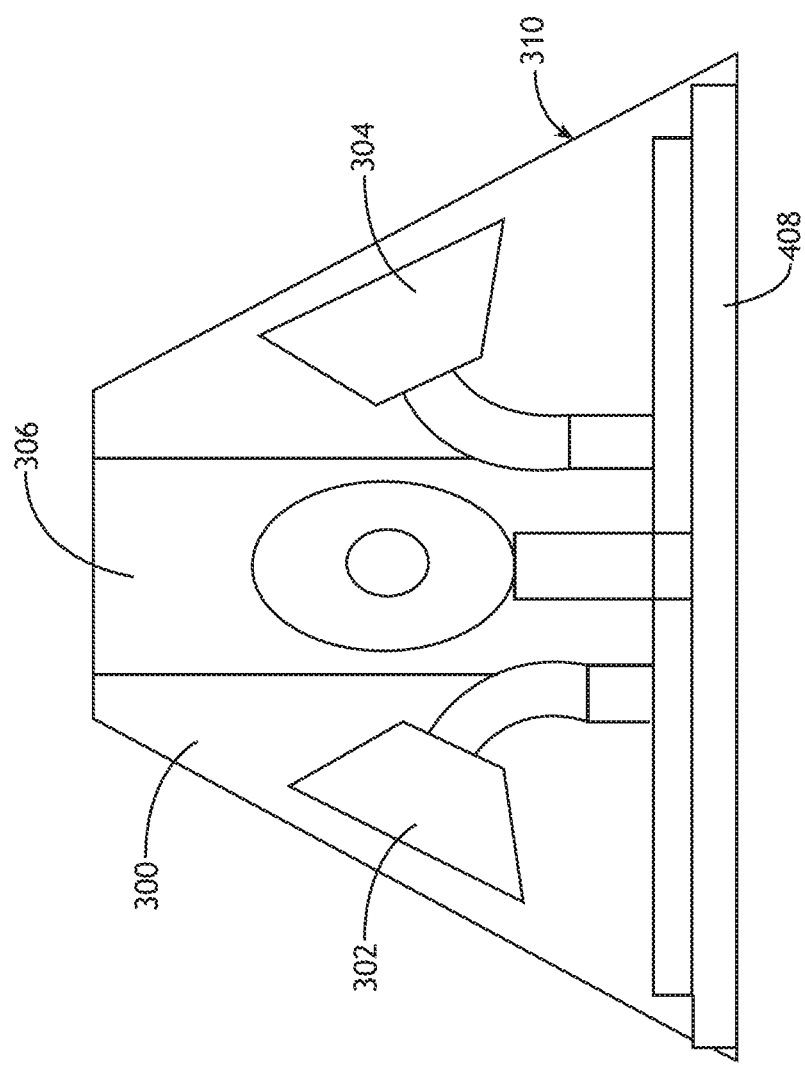
FIG. 3A shows a side view of a nose cone and radar antenna system according to an exemplary embodiment.
Figure 3B:
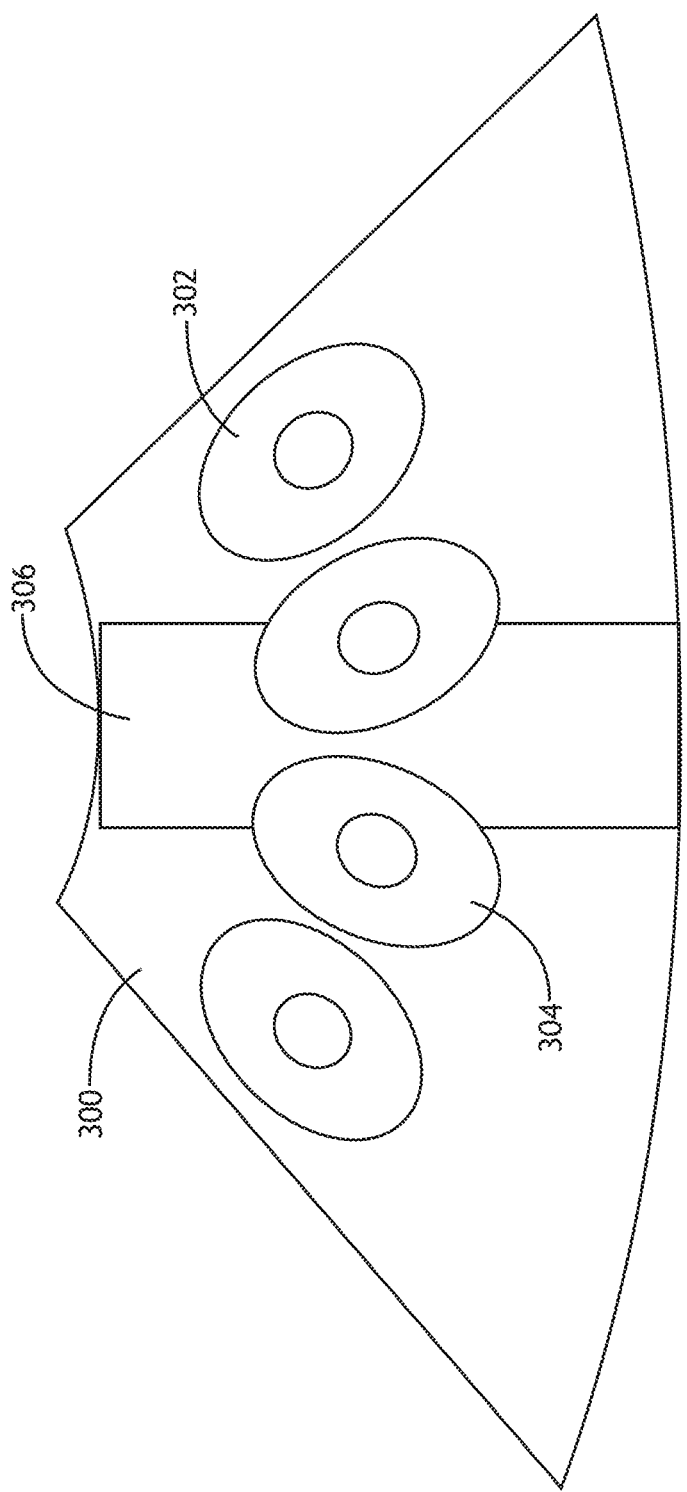
FIG. 3B shows an unfurled view of a nose cone and radar antenna system according to an exemplary embodiment.

Referring to FIG. 2, a side view of a nose cone and radar antenna system according to an exemplary embodiment is shown. Where the nose cone defines a generally unused annular space 200, a plurality of actively driven radiating horns 202, 204 (wave guides) are disposed in the annular space 200. The radiating horns 202, 204 may be angularly disposed about a central axis defined by the nose cone, including a central space 206 that may house electronics for navigational components such as a short-wave infrared location imaging system. In at least one embodiment, there are four radiating horns 202, 204 with printed circuit board to waveguide transitions incorporated into the printed circuit board. The open, radiating portion of each radiating horn 202, 204 in a short-wave infrared system may be disposed proximal to an exterior surface 210 of the nose cone such that the remaining material of the nose cone between the radiating horns 202, 204 and open air (both its thickness and dielectric characteristics) is known and can be accounted for when sending and receiving signals. In at least one embodiment, the open, radiating portion of the radiating horns 202, 204 may be generally rhombic or quadrilateral. Furthermore, when fabricating the nose cone with an embedded radar antenna system, nose cone material may be injection molded or otherwise additively manufactured or electroformed with the radiating horns 202, 204 in place such that the nose cone material may be structural, and hold the radiating horns 202, 204 in place. Additive manufacture may allow the nose cone with embedded radiating horns 202, 204 to be proportioned according to aerodynamic/mechanical considerations. In at least one embodiment, the radiating horns 202, 204 may be metallically additively manufactured with a PEEK nose cone injection molded around them. Alternatively, the radiating horns 202, 204 may be molded interconnect devices or plated injection molded PEEK (or other dielectric material).

In a system where radiating horns 202, 204 are disposed in a nose cone, and not coaxial with the fuselage, each beam is slightly offset. As the radiating horns 202, 204 are activated with variable phase between the radiating horns 202, 204, signal strengths are dependent on the canceling of those beams relative to the excess of the fuselage and the aerodynamic maneuvering of the of the projectile. Where all phases and amplitudes are substantially identical, the target is in collinear line-of-sight with flight motion; otherwise there may be imbalances.

In at least one embodiment, a feed layer 208 is disposed at a bottom surface of the nose cone; for example, the feed layer 208 may comprise a metallized ground plane with multi-layered printed circuit boards. In at least one embodiment, the top surface of the feed layer 208 touching the radiating horns 202, 204 is a ground plane while a bottom layer of the feed layer 208 is a millimeter wave printed circuit comprising active feed circuitry. The printed circuit board ground is in intimate contact with the ground that is contiguous with the exterior surface of the radiating horns 202, 204. The feed layer 208 may be configured such that certain radiating horns 202, 204 are dedicated transmitters and other radiating horns 202, 204 are dedicated receivers. Alternatively, the feed layer 208 may be configured to switch some or all of the radiating horns 202, 204 between a transmit mode and receive mode.

In at least one embodiment, the disposition and simultaneous, coherent operation of the radiating horns 202, 204 enable low aiming for the radar on a very limited volumetric platform. Embedding the radiating horns 202, 204 in the plastic dielectric material of the nose cone integrates and minimizes the parasitic effect of the plastic. It may be appreciated that completely embedding the radiating horns 202, 204 in the dielectric material of the nose cone provides structural stability and resistance to forces from acceleration. The radiating horns 202, 204 are driven simultaneously with phase shifted signals to produce desirable side lobe levels within the constraints of the annular space 200. In at least one embodiment, half of the radiating horns 202, 204 comprise a receive array while the other half comprise a transmit array. Pulsed system can be configured to operate as a single array the uses all the radiating horns 202, 204 in receive mode or a transmit mode at a given time.

Referring to FIGS. 3A-4B, a side view and unfurled view of a nose cone and radar antenna system according to an exemplary embodiment are shown. Where the nose cone defines a generally unused annular space 300, a plurality of generally ovoid radiating horns 302, 304 are angularly disposed in the annular space 300 about a central axis defined by the nose cone, including a central space 306 that may house electronics for navigational components such as a short-wave infrared system. The ovoid, open, radiating portion of each radiating horn 302, 304 may be disposed proximal to an exterior surface 310 of the nose cone such that the remaining material of the nose cone between the radiating horns 302, 304 and open air (both its thickness and electromagnetic insulating characteristics) is known and can be accounted for when sending and receiving signals. Radiating horns 302, 304 are disposed to maximize surface area for element gain. A radiating horn array may enable a degree of freedom to set radiating horn gain and beam width without changing the limited scan beam former circuit architecture. In one exemplary embodiment, where a short-wave infrared system is located is located in the central space 306, a mmWave aperture and radar system may be disposed in the annular space 300 coaxial to the fuselage's axis.

In at least one embodiment, a feed layer 308 is disposed at a bottom surface of the nose cone. The feed layer 308 may be configured such that certain radiating horns 302, 304 are dedicated transmitters and other radiating horns 302, 304 are dedicated receivers. Alternatively, the feed layer 308 may be configured to switch some or all of the radiating horns 302, 304 between a transmit mode and receive mode.

In at least one exemplary embodiment, for a conical frustum having a height of approximately 1.19 inches, a top radius of approximately 0.73 inches, and a bottom radius of approximately 1.49 inches, a nose cone would have a lateral surface area of approximately 9.84 inches². Where such a nose cone included an array of four radiating horns 302, 302 (or quadrilateral radiating horns 202, 204 as in FIG. 2), the nose cone embedded array may have maximum free space directivity of approximately 23.4 dB, bandwidth for maximum directivity of 19° to 16.3°, minimum free space directivity of approximately 5.4 dB, and bandwidth for minimum directivity of 83° to 122°. Metrics are similar for an eight-element array except that the maximum directivity may be approximately 21.4 dB and bandwidth for maximum directivity may be approximately 19° to 32.6°.

In at least one embodiment, radiating horns 302, 304 may be axially forward pointing; alternatively, they may be deliberately canted off the fuselage axis for uncongenial beam pattern synthesis. Furthermore, radiating horns apertures may be arbitrarily contoured. Perpendicular a transition from the radiating horns 302, 304 to a PCB feed layer 308 is integrated into the PCB feed layer 308 containing the RF circuits, etc.

Figure 4:
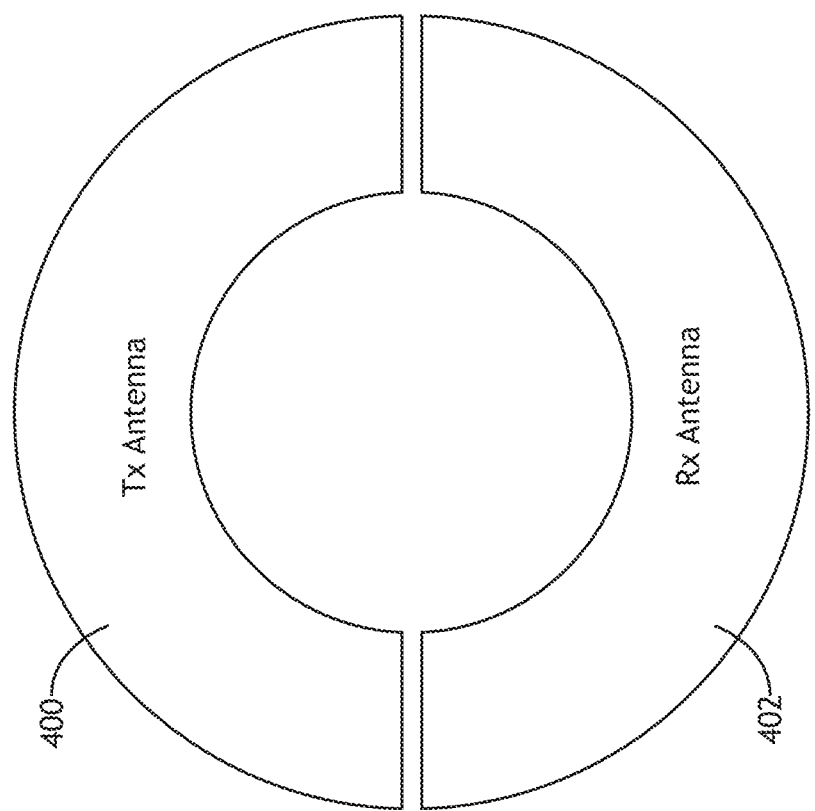
FIG. 4 shows a bottom, block representation of a nose cone according to an exemplary embodiment.

Referring to FIG. 4, a bottom, block representation of a nose cone according to an exemplary embodiment is shown. In at least one embodiment, the nose cone is divided a transmit antenna portion 400 and a receive antenna portion 402, each using approximately half of the available annular space in a nose cone.

Figure 5B:
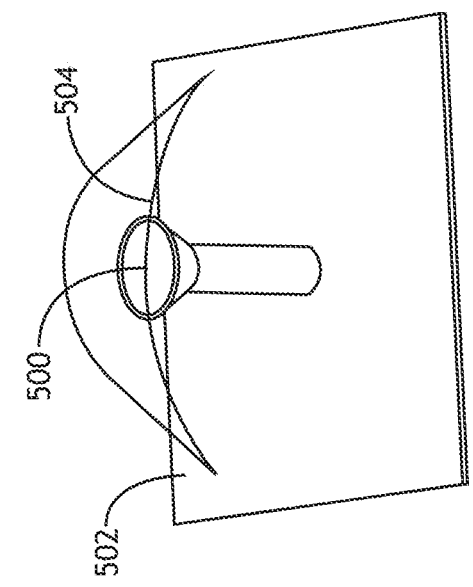
FIG. 5B shows a partial view of a radar aperture in a nose cone according to an exemplary embodiment.
Figure 5A:
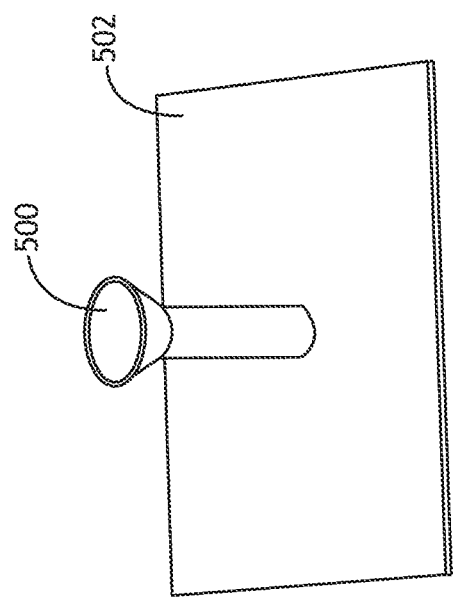
FIG. 5A shows a partial view of a radar aperture in a nose cone according to an exemplary embodiment.

Referring to FIGS. 5A-5B, partial views of a radar aperture in a nose cone according to an exemplary embodiment are shown. In simulated geometries, a conical radiating horn 500 is shows disposed on an aperture without a PEEK material nose cone (FIG. 5A) and with a PEEK material nose cone 504 (FIG. 5B). The radiating horn 500 is embedded a half wavelength (approximately 2.43 mm assuming 35 GHz and 3.1 Dk of PEEK) from the exterior surface of the PEEK material nose cone 504. The dielectric is in contact with the aperture 502 that may induce a small dielectric perturbation to the antenna aperture which may be adjusted as a tuning parameter to optimize radiation performance; lensing due to the dielectric material may be tuned out or exploited. While FIGS. 5A and 5B show a radiating horn 500 centered in the PEEK material nose cone 504, in actual implementation, the radiating horns 500 would be offset to accommodate a central short-wave infrared imaging lens system.

Figure 6:
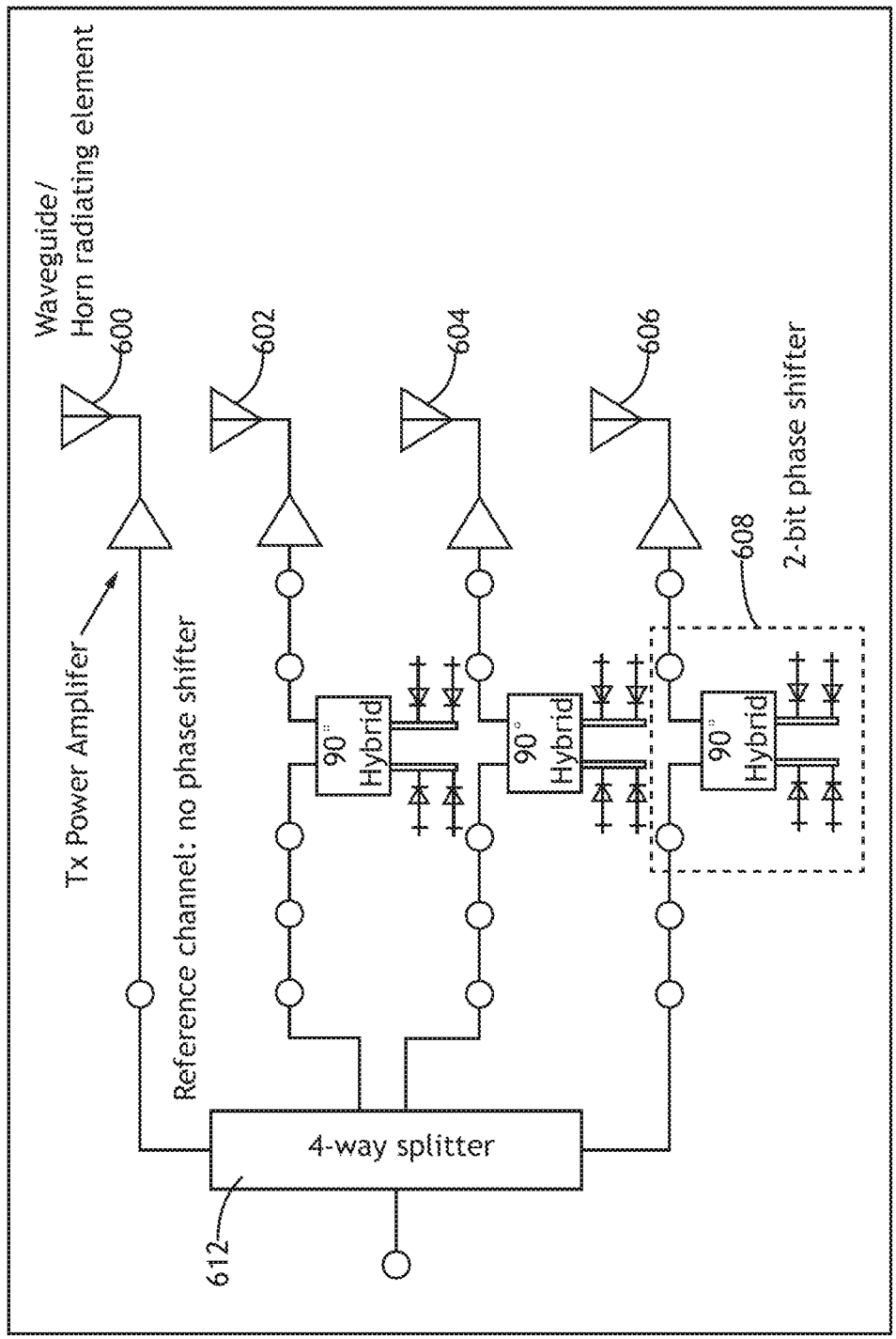
FIG. 6 shows a block diagram of a circuit useful for implementing exemplary embodiments.
Figure 7A:
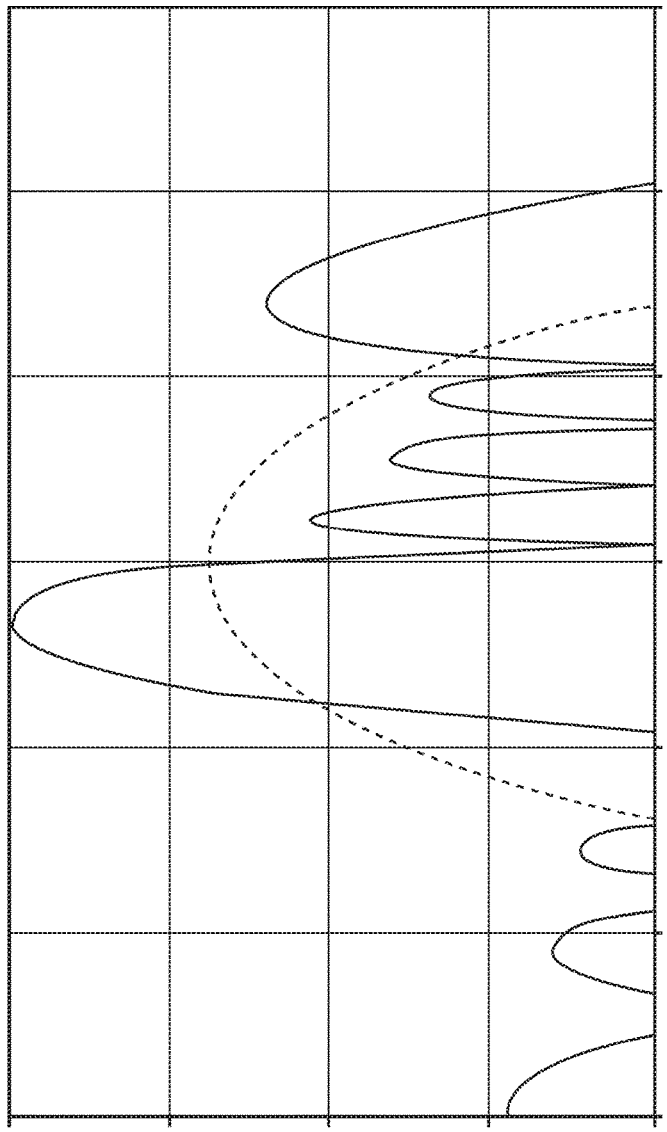
FIG. 7A shows a graph of a radiation patterns according to an exemplary embodiment.
Figure 7B:
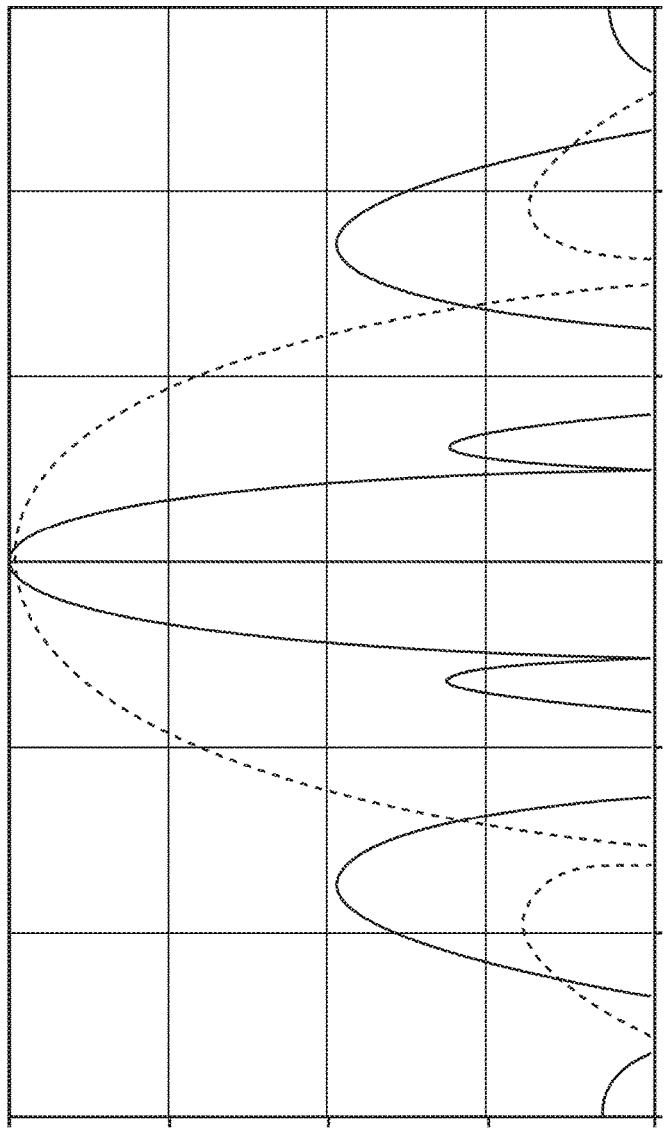
FIG. 7B shows a graph of a radiation patterns according to an exemplary embodiment.
Figure 7C:
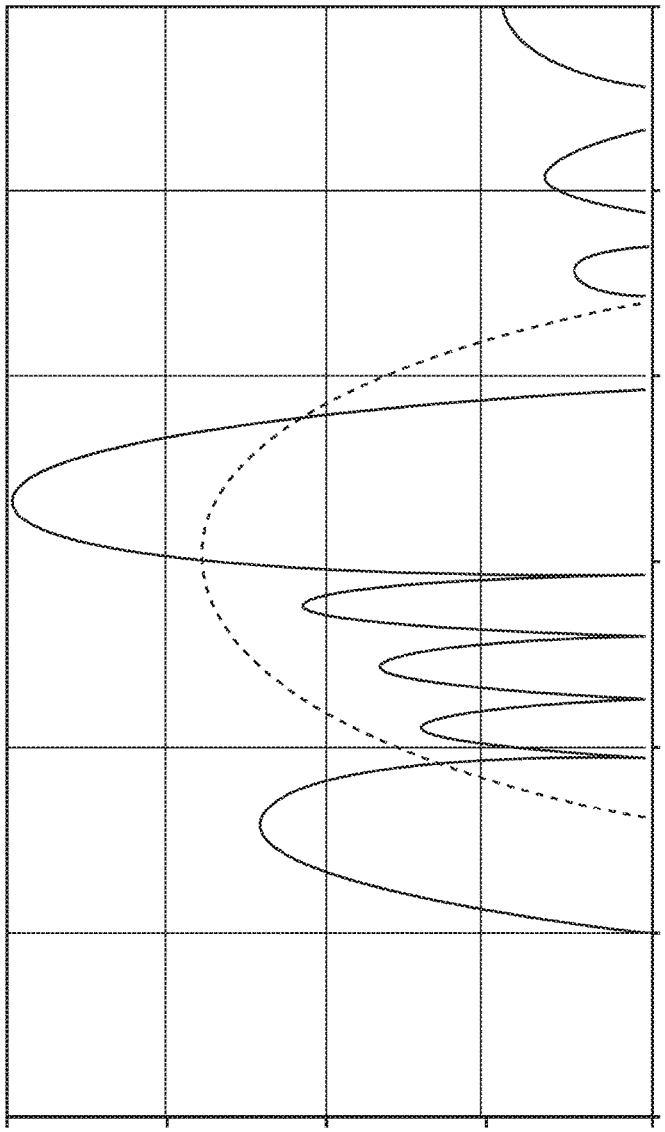
FIG. 7C shows a graph of a radiation patterns according to an exemplary embodiment.
Figure 8A:
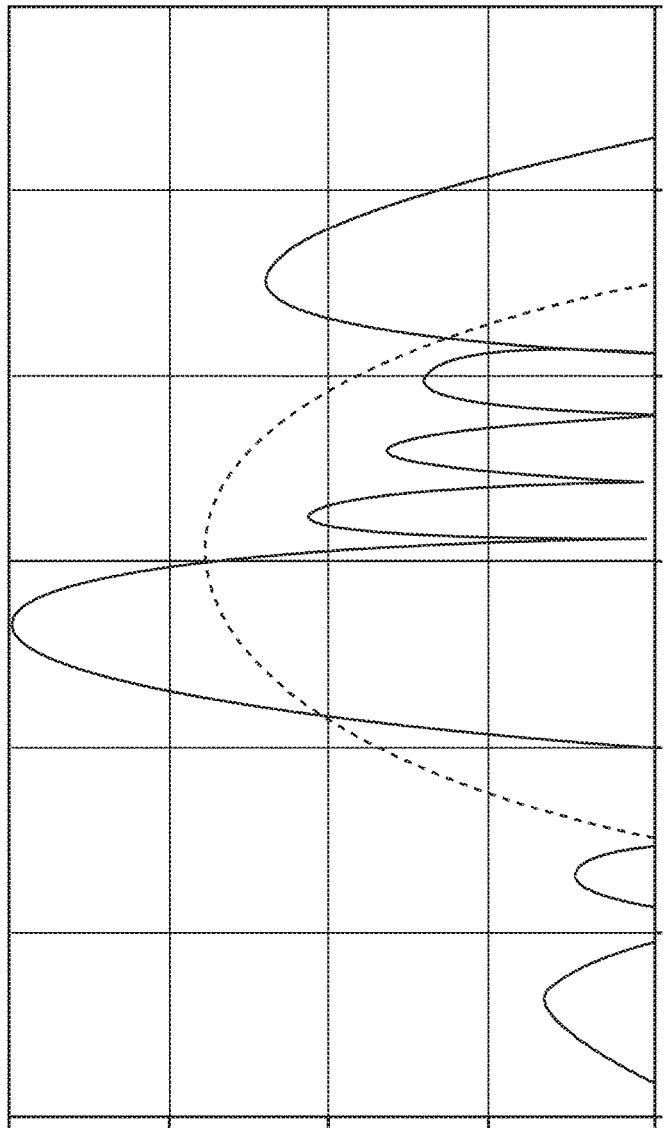
FIG. 8A shows a graph of a radiation patterns according to an exemplary embodiment.
Figure 8B:
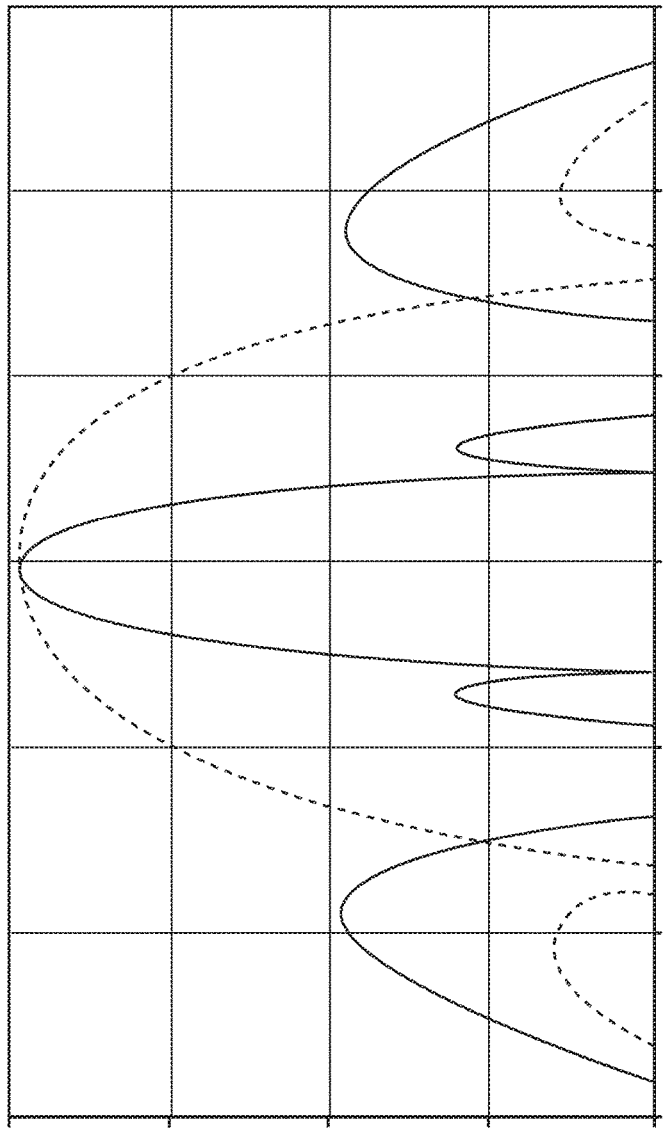
FIG. 8B shows a graph of a radiation patterns according to an exemplary embodiment.
Figure 8C:
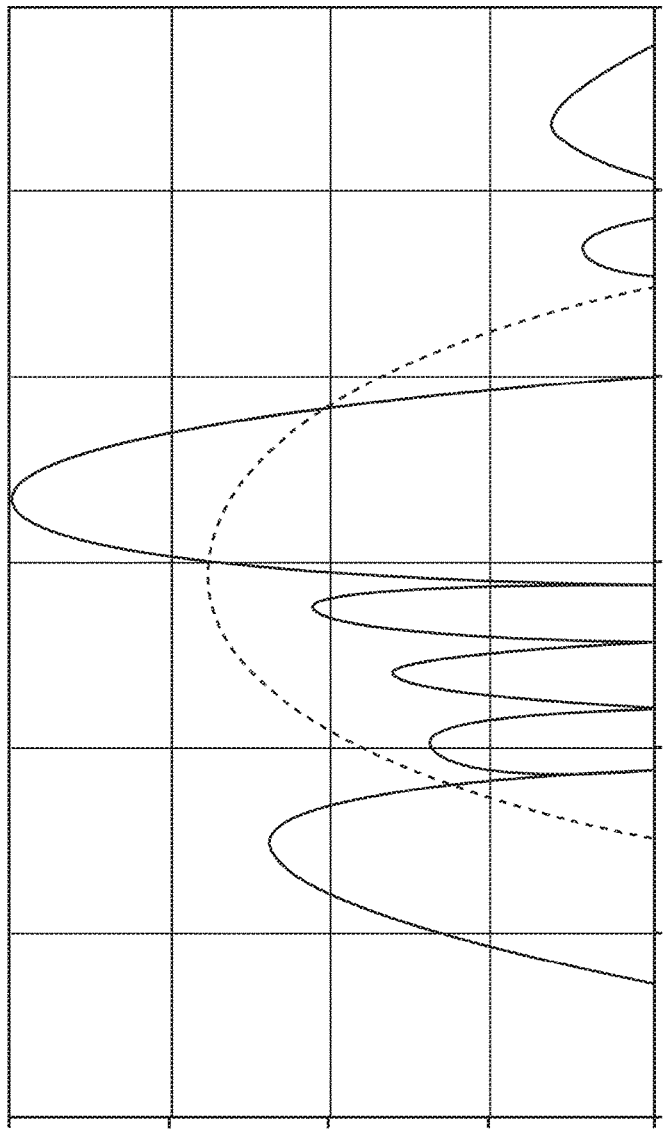
FIG. 8C shows a graph of a radiation patterns according to an exemplary embodiment.
Figure 9A:
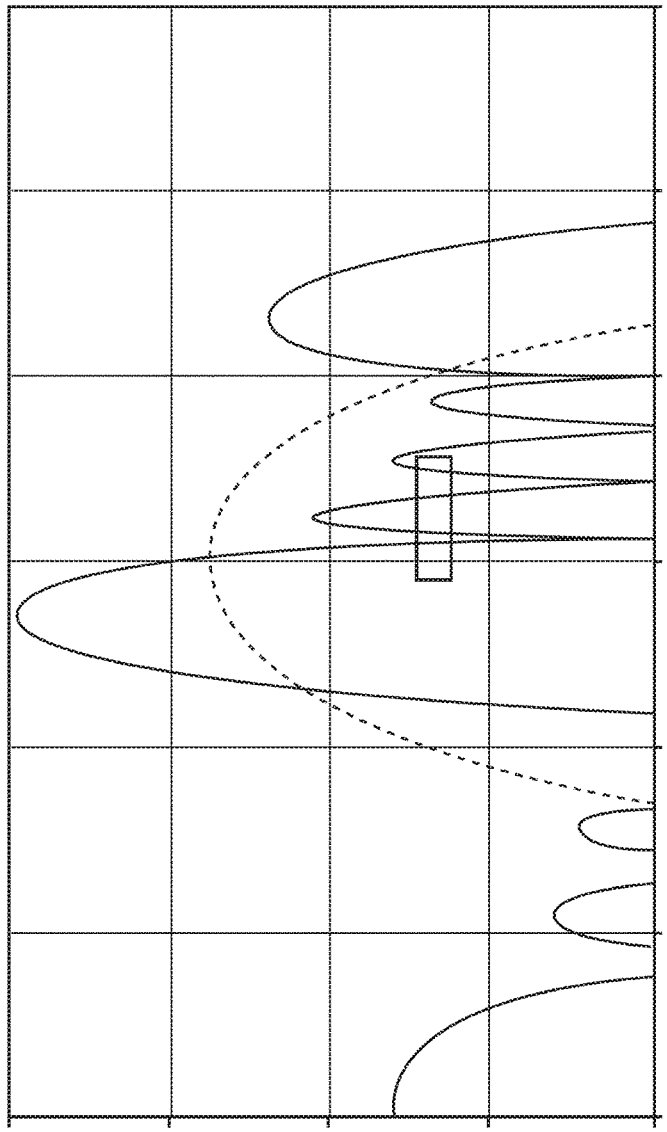
FIG. 9A shows a graph of a radiation patterns according to an exemplary embodiment.
Figure 9B:
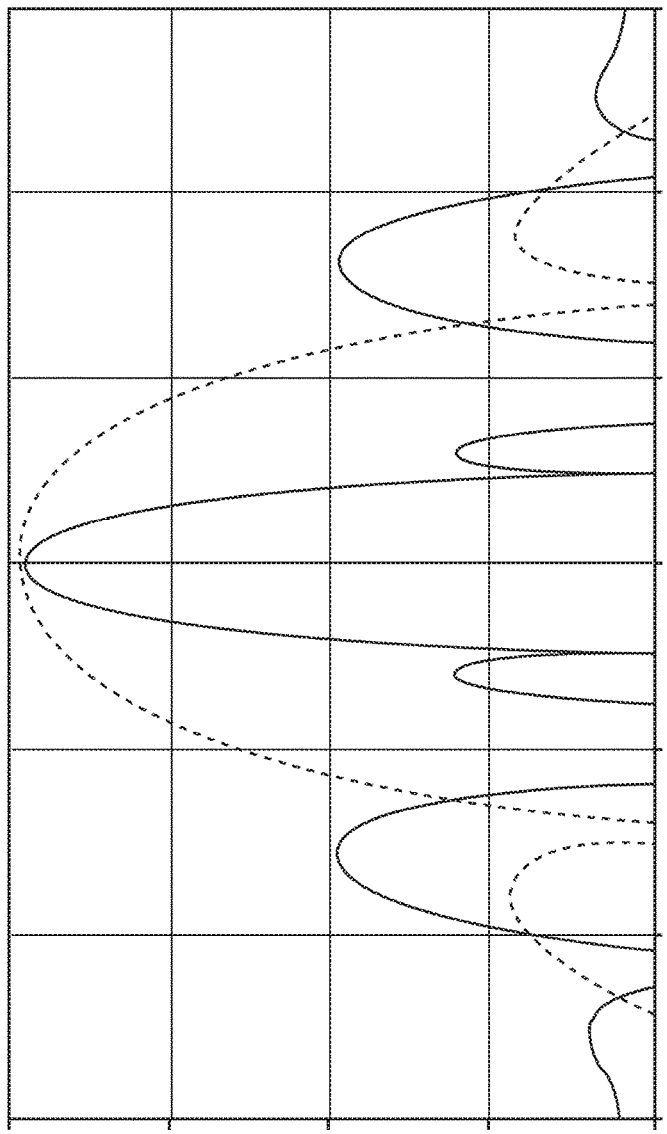
FIG. 9B shows a graph of a radiation patterns according to an exemplary embodiment.
Figure 9C:
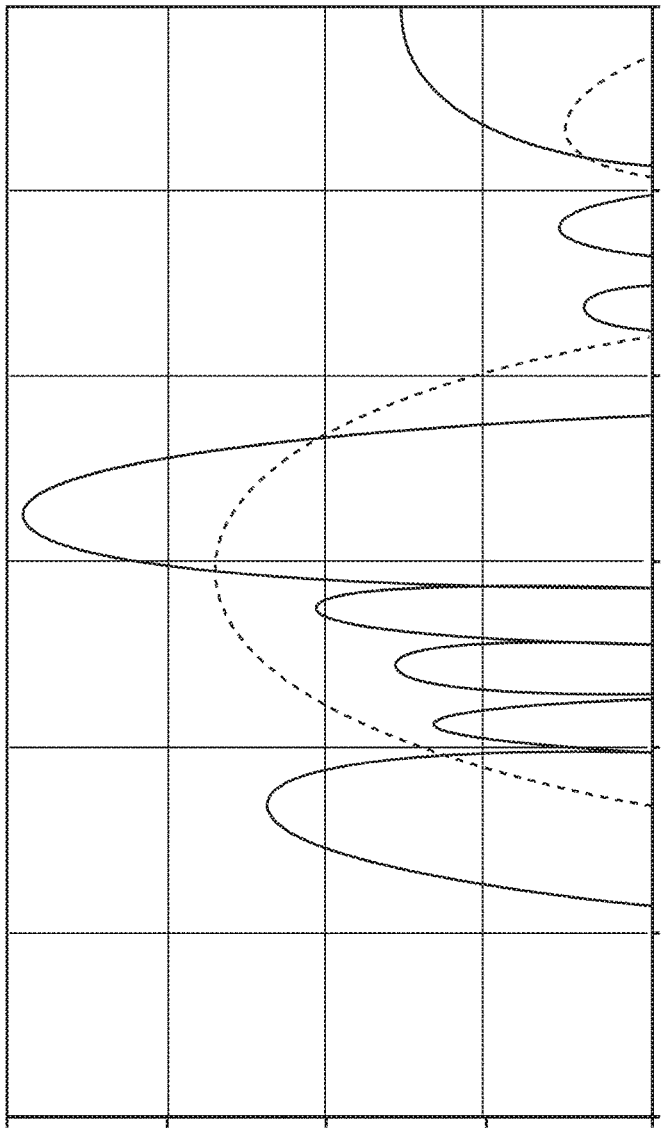
FIG. 9C shows a graph of a radiation patterns according to an exemplary embodiment.

Referring to FIG. 6, a block diagram of a circuit useful for implementing exemplary embodiments is shown operating in the transmit mode. A similar circuit block diagram may be configured for the receive signal, where the signal flow is in the reversed direction; from each of the radiating horns 600, 602, 604, 606, through low nose amplifiers and phase shifters, into a 4-way combiner. The circuit is configured to excite radiating horns 600, 602, 604, 606 embedded in a nose cone. A splitter 612 may transmit a signal and feed the signal to phase shifters 608, each corresponding to one of the radiating horns 600, 602, 604, 606. In at least one embodiment, each phase shifter 608 may comprise a two-bit phase shifter required for left/center/right limited beam scan. The beam forming network, including the phase shifters, as shown, is designed for optimal simplicity, low cost, and ease of manufacture. A hybrid coupler phase shifter may require two diodes per bit, but it may be appreciated that other phase shifter technologies such as RFIC-based phase shifters are envisioned. At least one reference channel corresponding to one of the radiating horns 600, 602 may be unshifted; a 1D linear array requires one fewer phase shifted channel than the number of radiating horns 600, 602, 604, 606. In one exemplary embodiment, the circuit may be configured to minimize adjustable phase shifter count and shifter circuit complexity; with sufficient radiating horn directivity, as little as two radiating horns 600, 602, 604, 606 and one phase shifter 608 may suffice. More complex limited scan arrays may be implemented with additional active RF circuitry. Active radiating horns 600, 602, 604, 606 may offset phase shifter loss for optimal effective isotropic radiated power (EIRP) and noise figures, with full EIRP radiated at any time instant.

In at least one embodiment, a 2D active electronically scanned array requires one fewer phase shifter than the total number of array elements. Arrays may be active electronically scanned arrays or passive electronically scanned arrays. The active electronically scanned array architecture requires fewer T/R module RFICs and it may be easier to raise EIRP while maintaining noise figures.

In at least one embodiment, a limited scan array as in FIG. 6 may be configured to operate in a transmit mode (as shown); an analogous circuit enables a similar configuration to work in a receive mode. Transmit/receive module circuits that include power amplifiers, low noise amplifiers, phase shifters and sets of switching circuits may enable an array configuration utilizing a ½ duplex pulsed transmit/receive radar mode.

Referring to FIGS. 7A-7I, graphs of a radiation patterns according to an exemplary embodiment are shown. For a four-element system operating at 35 GHz with at least one λ element spacing and at least one λ circular horn aperture, and phase shift at the horn aperture of 90° (FIG. 7A), 0° (FIG. 7B) and 270° (FIG. 7C), the radiating patterns may exhibit a gentle 20 dB Taylor taper. The highest side lobe is a strong function of the aperture element directivity and aperture directivity per number of radiating horns, and is an attenuated grating lobe. Array spacing and array amplitude taper also impact the highest side lobe. In at least one embodiment, 10 dB beam slope discrimination from Left-to-Center-to-Right beam positions is demonstrated with −15 dB side lobe levels. Parasitic beam squint-free performance is possible across at least ten percent of the instantaneous bandwidth (IBW); squint-free IBW is a function of the number of radiating horns, spacing, and aperture directivity.

Referring to FIGS. 8A-8I, graphs of a radiation patterns according to an exemplary embodiment are shown. For a four-element system operating at 33 GHz with at least one λ element spacing and at least one λ circular horn aperture, and phase shift at the horn aperture of 90° (FIG. 8A), 0° (FIG. 8B) and 270° (FIG. 8C), the radiating patterns may exhibit a gentle 20 dB Taylor taper. The highest side lobe is a strong function of the aperture element directivity and is an attenuated grating lobe, and aperture directivity per number of radiating horns. Array spacing and array amplitude taper also impact the highest side lobe. In at least one embodiment, 10 dB beam slope discrimination from Left-to-Center-to-Right beam positions is demonstrated with −15 dB side lobe levels. Parasitic beam squint-free performance is possible across at least ten percent of the instantaneous bandwidth (IBW); squint-free IBW is a function of the number of radiating horns, spacing, and aperture directivity.

Referring to FIGS. 9A-9I, graphs of a radiation patterns according to an exemplary embodiment are shown. For a four-element system operating at 37 GHz with at least one λ element spacing and at least one λ circular horn aperture, and phase shift at the horn aperture of 90° (FIG. 9A), 0° (FIG. 9B) and 270° (FIG. 9C), the radiating patterns may exhibit a gentle 20 dB Taylor taper. The highest side lobe is a strong function of the aperture element directivity and is an attenuated grating lobe, and aperture directivity per number of radiating horns. Array spacing and array amplitude taper also impact the highest side lobe. In at least one embodiment, 10 dB beam slope discrimination from Left-to-Center-to-Right beam positions is demonstrated with −15 dB side lobe levels. Parasitic beam squint-free performance is possible across at least ten percent of the instantaneous bandwidth (IBW); squint-free IBW is a function of the number of radiating horns, spacing, and aperture directivity. FIGS. 7A-9C demonstrate invariant parasitic beam squint-free performance across at least a 10% instantaneous bandwidth (33-37 GHz). Squint-free instantaneous bandwidth is a function of radiating element count, array factor, and radiating horn aperture directivity.

Figure 10A:
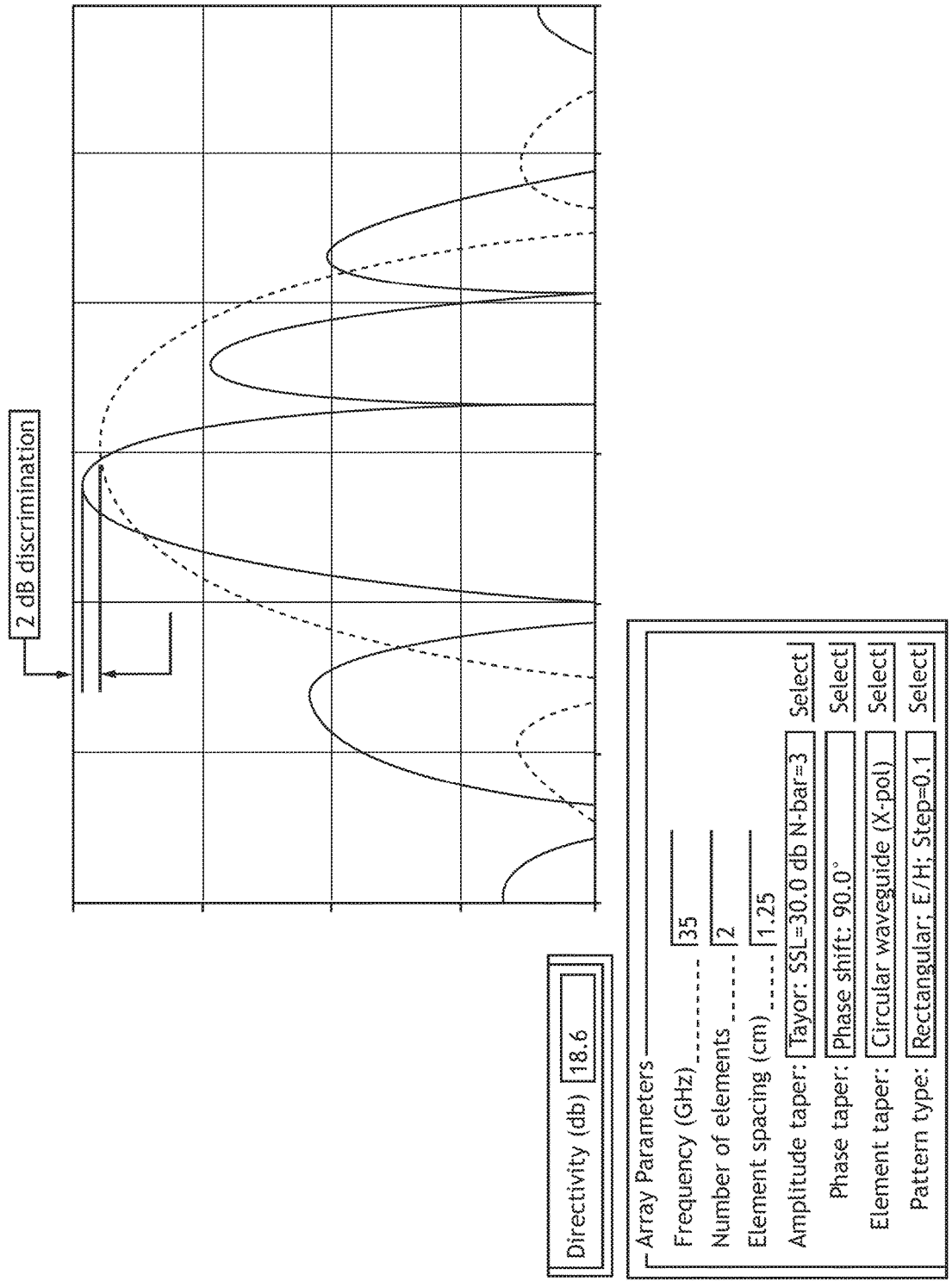
FIG. 10A shows a graph a radiation patterns according to an exemplary embodiment.
Figure 10B:
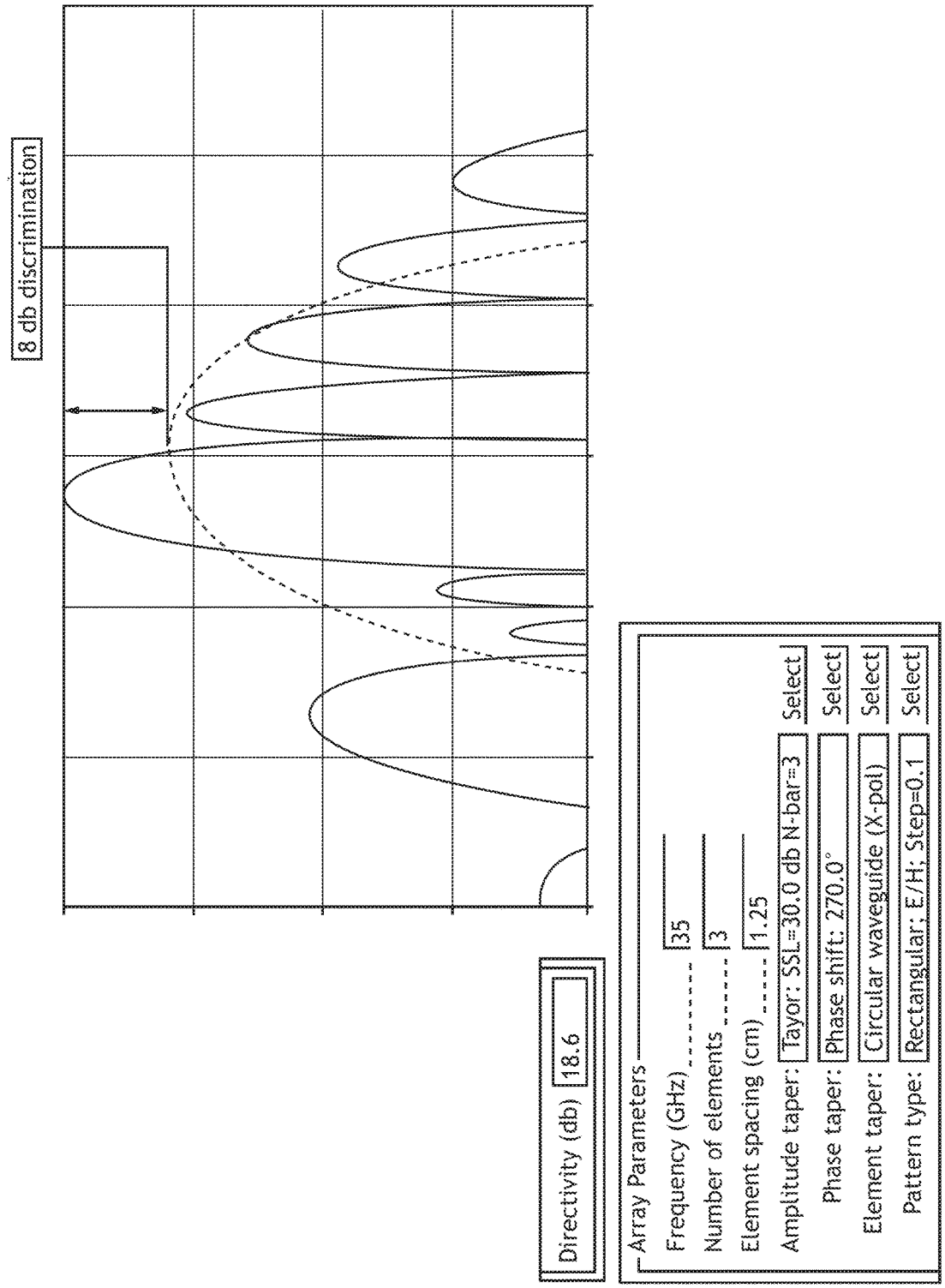
FIG. 10B shows a graph of a radiation patterns according to an exemplary embodiment.
Figure 10C:
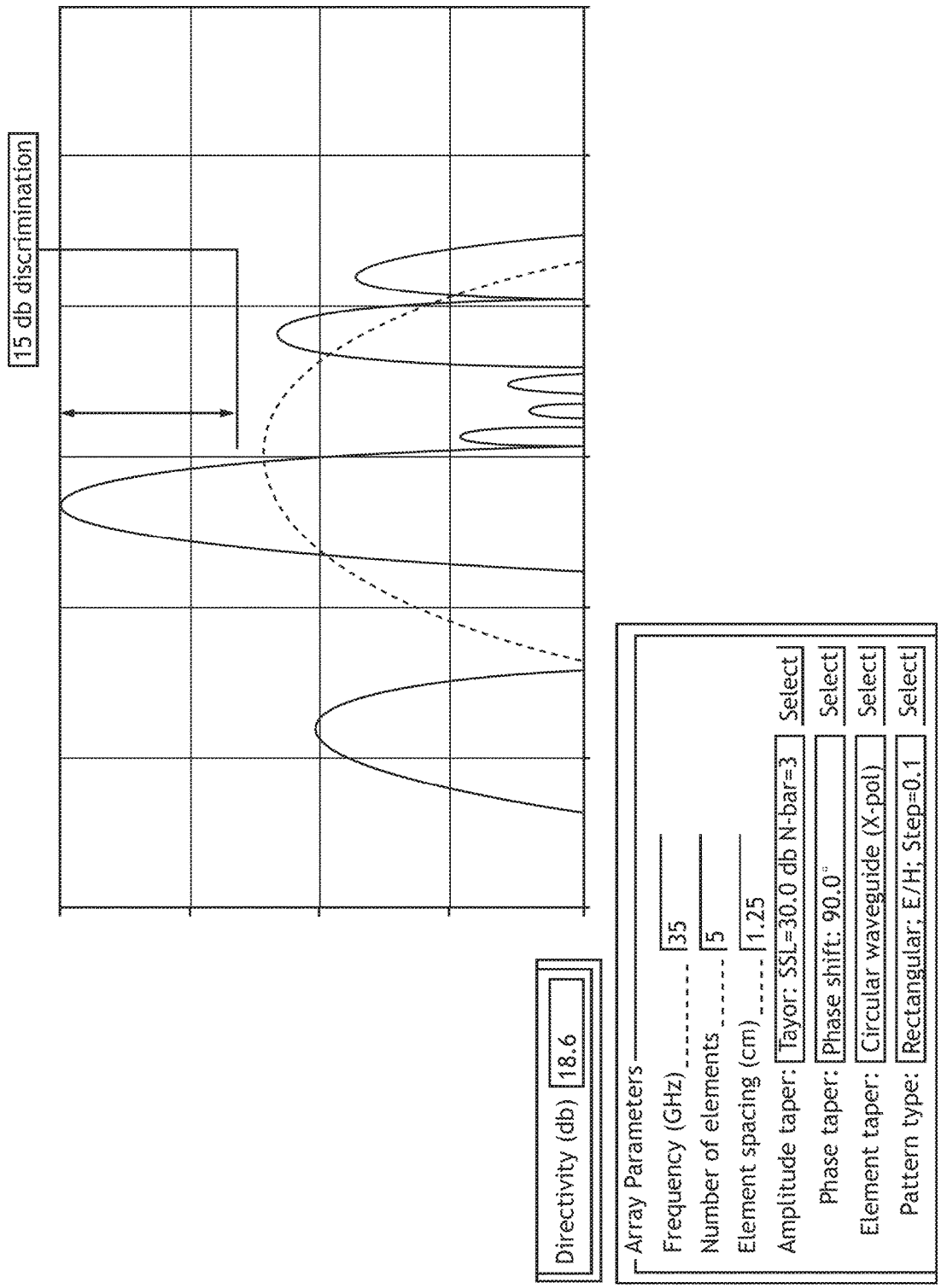
FIG. 10C shows a graph of a radiation patterns according to an exemplary embodiment.

Referring to FIGS. 10A-10C, graphs of a radiation patterns according to an exemplary embodiment are shown. For a two-element system (as in FIG. 10A), a three-element system (as In FIG. 10B), or a five-element system (as in FIG. 10C) operating at 35 GHz with at least one λ element spacing and at least one λ circular horn aperture, the radiating patterns may exhibit a gentle 20 dB Taylor taper. The highest side lobe is a strong function of the multi-horn array factor pattern of the radiating horn location multiplied by the aperture element directivity. The horns are spaced at greater that ½ wavelength, so grating lobes (aka false main beams) exist. The grating lobe of the radiating horn array pattern is attenuated by the aperture directivity of each radiating horn and is therefore manifested as a higher side lobe as shown in the figures. Array spacing and array amplitude taper also impact the highest side lobe. Beam slope discrimination is a function of element count for a given aperture element directivity and array spacing. For example, a two-element system may exhibit 2 dB discrimination; a three-element system may exhibit 8 dB discrimination; and a five-element system may exhibit 15 dB discrimination.

Figure 11:
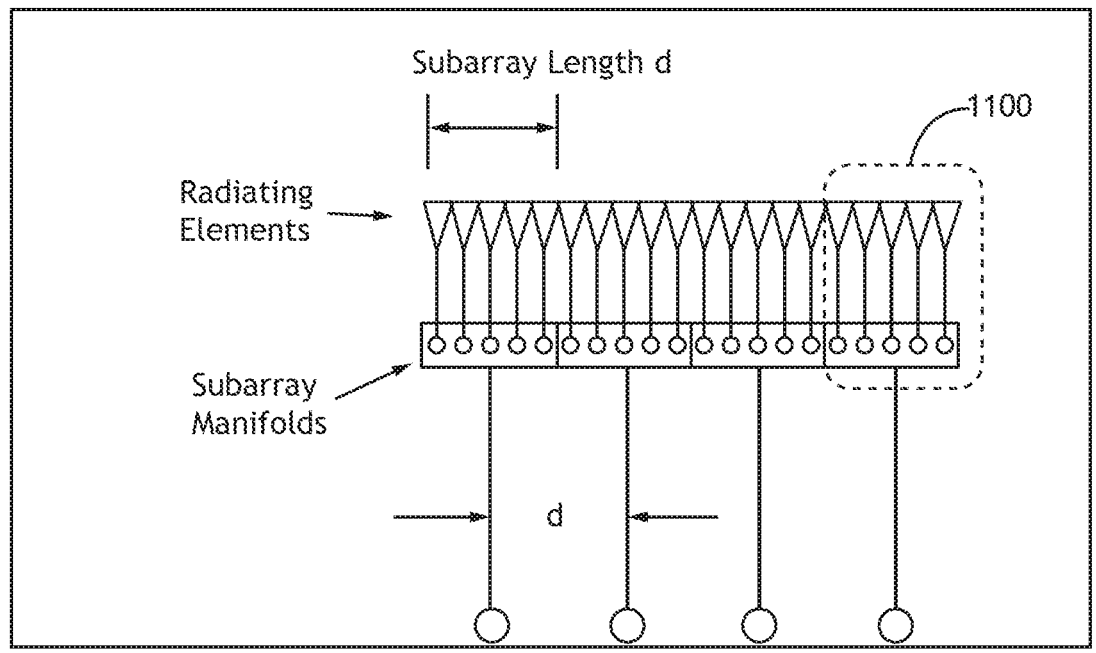
FIG. 11 shows a side representation of radiating horns in a subarray according to an exemplary embodiment.
Figure 12:
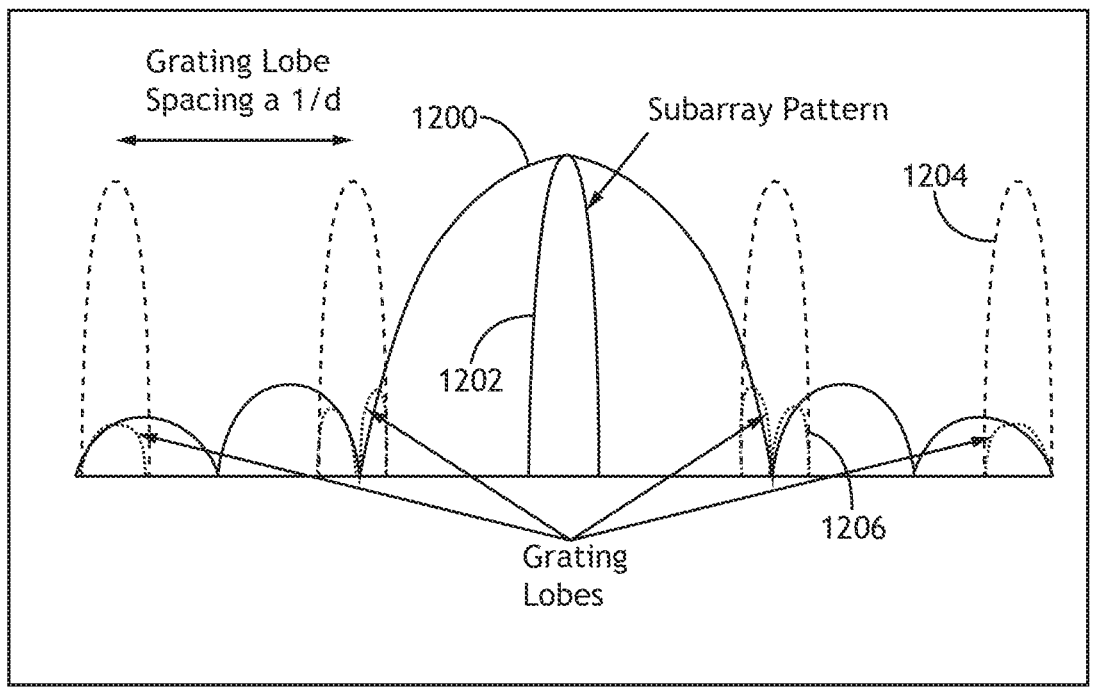
FIG. 12 shows a radiation pattern according to an exemplary embodiment.

Referring to FIGS. 11 and 12, an equivalent representation of the radiating horns is a subarray 1100 and corresponding radiation pattern according to an exemplary embodiment are shown. The radiating horn and subarray may have identical directivity, so subarray theory can be applied to the concepts as described herein. A subarray radiation pattern 1200 (one of the radiating horns) is produced with low side lobes, similar to the case of a λ/2 spaced subarray. The grating lobe series 1204 are due to the radiating horn array's array factor being spaced greater than ½ wavelength. These grating lobes are attenuated by the radiating horn's (aka subarray) radiating pattern as shown in FIG. 12 as small side lobe 1206. These attenuated grating lobe/sidelobes result in higher side lobes, as shown in FIGS. 8A-9C. This is in accordance with array pattern multiplication theory. Grating lobes 1206 grow and shrink with scan due to the pattern multiplications with the radiating horns (the array element) radiation pattern, and appear as modulating side lobes as shown in FIGS. 8A-9C. This effect may be minimized for limited scan arrays.

In at least one embodiment, the subarrays 1100 produce the subarray radiation pattern 1200. The array of subarrays produce secondary radiation patterns 1202, 1204, which are part of the grating lobe series. An aggregate radiation pattern is produced by multiplying the subarray radiation pattern and the secondary array factor radiation patterns which create patterns 1202, 1204, which may comprise grating lobes. The aggregate radiation pattern attenuates the side lobes of the grating lobe patterns 1202, 1204, etc. Radiating horns have a narrower beam with a greater gain than individual radiating elements in a conventional face array. Each radiating horn may operate as a subarray 1100 that has a directive radiation pattern. Each radiating horn "subarray equivalent" attenuate the main beam of the neighboring radiating horns. Gain and the beam width of the radiating horns may be directive enough to squelch main beams of those neighboring radiating horns. Main beams move with the false main beams, but are attenuated and manifest at a level modulated in amplitude, low enough that they do not interfere. Embodiments may enable radiating horns that are equivalent to a ½ spaced subarray, and an array of subarrays equivalents (the radiating thorns). The feed network of the array may be simpler than existing systems and the required phase shift count may be optimally minimized.

Embodiments of the present disclosure enable a small environmentally robust, nose cone compatible 1D or 2D limited scan horn radiating element-based millimeter wave limited scan array antenna system collated with, and complementary to, a short-wave infrared target location imaging system for munitions or other projectile platforms. Radiating horn elements are minimally perturbed by the short-wave infrared housing and cone dielectric loading. The dielectric cone only acts as a protective superstrate or lens to the aperture antennas. A PEEK cone provides a built-in radome. The nose cone dielectric can be used to tune match and optimize the beam. Post-processing of multiple radar return pulses can be post processed for monopulse-like synthetic beam sharpening. Radiating horn structures can be formed by metallic additive manufacture, electro-forming, or plating of plastic. The nose cone may be injection molded about radiating horn array. Radiating horns may be dielectric loaded if required. The nose cone may be injection molded about a metallic radiating horn array, potentially an aperture matching/lens device. In at least one embodiment, waveguide transition is embedded in RF PCB, and connected to the radiating horns by metallic ground bonding.

Embodiments of the present disclosure offer minimal platform perturbations. Embedding the radiating horns in the nose cone preclude the severe dielectric lensing associated with patch-type radiators. Metallic loading of fuselage housing is minimal because radiating horns/waveguides are not driven against RF ground like patch type radiators.

Embodiments of the present disclosure may be integrated with microwave/mmWave dichroic surface-based C-Band height-of-burst altimeter antenna. Limited scan array offers beam deflection target discrimination with a very small, conformal form factor. Embodiments may enable a mmWave aperture and radar system compatible with a short-wave infrared system that is coaxial to a fuselage's axis.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A electronically scanned array comprising:
   a plurality of radiating horns, each disposed around an axis defined by a nose cone;
   a short-wave infrared location imaging system disposed in a central space of the nose cone; and
   a feed layer connected to each of the radiating horns the feed layer comprising a top surface configured as a ground plane in electronic communication with the radiating horns and a bottom surface comprising millimeter wave printed circuitry,
   wherein:
      the plurality of radiating horns are embedded in a dielectric material comprising the nose cone; and
      the feed layer is configured to simultaneously activate each of the plurality of radiating horns to produce a limited scan steerable radiation pattern.

2. The electronically scanned array antenna of claim 1, wherein the feed layer comprises a plurality of phase shifters, each of phase shifters associated with one of the plurality of radiating horns.

3. The electronically scanned array antenna of claim 2, wherein each phase shifter comprises a two-bit phase shifter.

4. The electronically scanned array antenna of claim 2, wherein one radiating horn corresponds to a non-phase shifted channel.

5. The electronically scanned array antenna of claim 1, wherein the electronically scanned array is actively driven.

6. The electronically scanned array antenna of claim 1, wherein the electronically scanned array is passively driven.

7. The electronically scanned array antenna of claim 1, wherein:
   a first set of radiating horns and corresponding feed layer circuitry is dedicated to a ½ duplex receive channel; and
   a second set of radiating horns and corresponding feed layer circuitry is dedicated to a ½ duplex transmit channel.

8. The electronically scanned array antenna of claim 1, wherein the feed layer is configured to drive each of the plurality of radiating horns as a subarray of the electronically scanned array.

9. An electronically scanned radar array antenna comprising:
   a plurality of radiating horns, each disposed in an annular space around an axis defined by the nose cone;
   a short-wave infrared location imaging system disposed in a central space of the nose cone; and
   a feed layer connected to each of the radiating horns the feed layer comprising a top surface configured as a ground plane in electronic communication with the radiating horns and a bottom surface comprising millimeter wave printed circuitry,
   wherein:
      the plurality of radiating horns are embedded in a dielectric material comprising the nose cone;
      the plurality of radiating horns are configured as an electronically scanned array;
      the feed layer is configured to simultaneously activate each of the plurality of radiating horns to produce a conical limited scanning radiation pattern; and
      the feed layer is configured to attenuate side lobes.

10. The electronically scanned radar array antenna of claim 9, wherein the feed layer comprises a plurality of phase shifters, each of phase shifters associated with one of the plurality of radiating horns.

11. The electronically scanned radar array antenna of claim 10, wherein each phase shifter comprises a two-bit phase shifter.

12. The electronically scanned radar array antenna of claim 10, wherein one radiating horn corresponds to a non-phase shifted channel.

13. The electronically scanned radar array antenna of claim 9, wherein the electronically scanned array is actively driven.

14. The electronically scanned radar array antenna of claim 9, wherein:
   a first set of radiating horns and corresponding feed layer circuitry is dedicated to a sequential receive channel; and
   a second set of radiating horns and corresponding feed layer circuitry is dedicated to a sequential transmit channel.

15. The electronically scanned radar array antenna of claim 9, wherein the feed layer is configured to drive each of the plurality of radiating horns as a subarray of the electronically scanned array.

* * * * *